United States Patent [19]
Dorton

[11] 3,785,015
[45] Jan. 15, 1974

[54] SAFETY HOOK
[76] Inventor: Robert H. Dorton, P.O. Box 122, Eaton, Ind. 47338
[22] Filed: July 26, 1972
[21] Appl. No.: 275,223

[52] U.S. Cl. .................. 24/241 PP, 24/232, 294/82
[51] Int. Cl. ............................................. A44b 13/00
[58] Field of Search .................... 24/241 R, 241 P, 24/241 PP, 241 PL, 241 TC, 241 SL, 230.5 SA, 232, 238, 242, 231; 294/82

[56] References Cited
UNITED STATES PATENTS
| | | | |
|---|---|---|---|
| 2,462,965 | 3/1949 | Henderson | 24/232 |
| 2,857,644 | 10/1958 | Gale | 24/242 |
| 398,599 | 2/1889 | Fessenden | 24/238 |
| 1,232,417 | 7/1917 | Wickes | 24/242 |

FOREIGN PATENTS OR APPLICATIONS
19,528  7/1913  Great Britain .................. 24/232

Primary Examiner—Bobby R. Gay
Assistant Examiner—Kenneth J. Dorner
Attorney—Maurice A. Weikart

[57] ABSTRACT

Disclosed is a load carrying hook for hoisting apparatus or the like in which the clevis portion is provided with registering elongated apertures and the eyelet for the hook portion has a registering circular aperture through which a pivot pin extends. The hook and pin can thus move rectilinearly within the elongated slots in the clevis and cooperating abutments are provided on the clevis and the hook. When these abutments are engaged, as occurs when the pin and hook are at one limiting position in the elongated slots, a closure arm carried by the clevis locks closed the open side of the hook.

3 Claims, 4 Drawing Figures

PATENTED JAN 15 1974 3,785,015

SAFETY HOOK

BACKGROUND OF THE INVENTION

Hooks of the type under consideration are used with cable tackle to hoist or displace relatively heavy loads. They, conventionally, are formed by a clevis to which a hoist line is attached and a hook member pivoted to the clevis. Safety hooks, hooks having a closure member carried by the clevis which closes the open end or bight of the hook, are not unknown in the prior art. These find particular utility in applications where it is necessary to insure that the load does not become detached from the hook. An example of such prior art safety hooks is disclosed in U.S. pat. No. 2,857,644.

The concept of the present invention envisages a safety hook in which no resilient members or springs are necessary and in which the locking arm may be locked in position across the bight of the hook by a camming action of the pivot pin. The engaging or locking surfaces of the hook and clevis, forced together when the hook is loaded, are relatively close, laterally, to the line along which the force exerted by the load acts so that the force moment on the locking arm is minimized. The arrangement is such that the load exerts a force or leverage on the closure arm tending to retain the arm tightly in locking position across the open side of the hook. The locking arm is bifurcated at its free end accommodates a portion of the hook thus supporting the nose or tip of the hook.

DESCRIPTION OF THE PREFERRED EMBODIMENT

Figure 1:
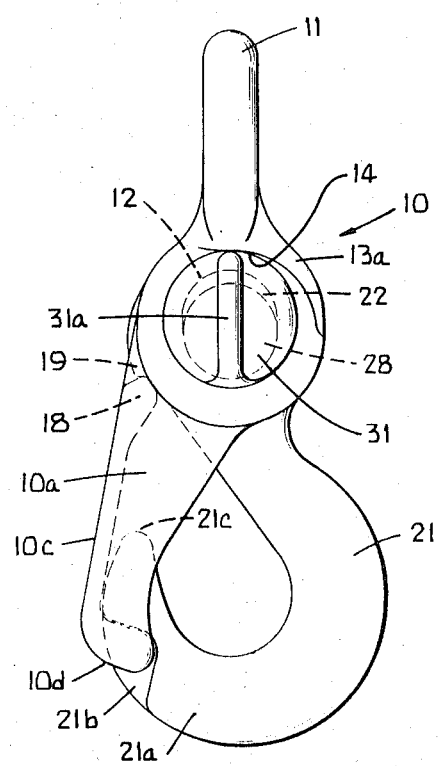
FIG. 1 is a side view of the safety hook embodying the present invention with the closure arm in locking position.

Referring initially to FIG. 1, the safety hook of the present invention includes a clevis member indicated generally at 10 which is adapted for attaching to a cable by means of the eyelet 11 formed in the upper end of the clevis. The clevis has depending, spaced, parallel closure arms 10a and 10b and adjacent the eyelet 11 the arms are provided with registering, elongated apertures 12, the elongated configuration of the apertures 12 being visible particularly in FIG. 1. The major axes of the elongated apertures 12 are in the direction of load application to the clevis, that is, they are aligned with the eyelet 11 and the depending hook component to be subsequently described. As may be seen in FIG. 2 the outer faces of the arms 10a and 10b are identically formed and each has cam elements 13a and 13b, respectively. As may best be seen in FIG. 1 the cam elements are formed to provide a curved surface identified at 14 with respect to member 13a and 16 (FIG. 2) with respect to member 13b.

As will be evident from FIGS. 2 and 3, the spaced arms 10a and 10b are joined, below the aperture 12, by an integral plate portion 10c. In the upper margin of the plate 10c there is formed an integral abutment 18 which cooperates with an adjacent abutment 29 formed on the apertured eye portion of a hook component 21.

Figure 4:
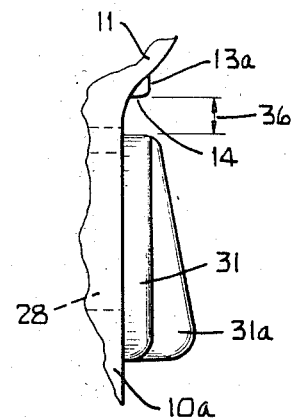
FIG. 4 is a fragmentary end view showing a portion of the structure in FIG. 2 in released position.

The curved lower portion 21a of the hook component has an area of reduced thickness 21b which fits within the bifurcated tip 10d of the closure arm. The tip 21c of the hook component, when the closure member is in its position of FIG. 1, is disposed between the arm portions 10a and 10b of the closure arm. The upper end of the hook portion 21 is provided with a circular aperture 22 which registers with the apertures 12 in the clevis. Accommodated with repsect of the clevis. is a pivot pin 28, the pin extending also through the elongated, registering apertures 12 and carrying on its ends identical members 31 and 32 (FIG. 2), these members each carry an extending rib 31a and 32a, respectively, which facilitates manual rotating of the member 31. As a comparison of FIGS. 1 and 2 will indicate, the members 31 and 32 are circular in configuration and are rigidly connected to the pin 28 but are eccentric with respect to the rotational axis of the pin, that is, the center of the circular members 31 and 32 is offset downwardly from the longitudinal central axis of the pin 28. The peripheral portion of the members 31 and 32 cooperates with the camming surfaces 14 and 16, respectively, as will be evident in FIGS. 1 and 2. When the knob member 31 is in its position of FIG. 1, the periphery of the knob will be in engagement with the surface 14 on the clevis, as will its counterpart knob 32 with respect to the surface 16. Under these conditions the hook 21 and the pivot pin 28 are incapable of being moved rectilinearly (vertically) with respect to the clevis. When either of the knob members 31 or 32 has been utilized to rotate the pin 28 through 180 degrees as indicated in FIG. 4, the periphery of the knob 31 will be spaced, by a distance indicated at 36 in FIG. 4, from the adjoining cam surface 14. Under these conditions the hook and the pin are free to be moved rectilinearly a distance indicated at 36 in FIG. 4 rectilinearly (vertically) with respect to the clevis.

Figure 2:
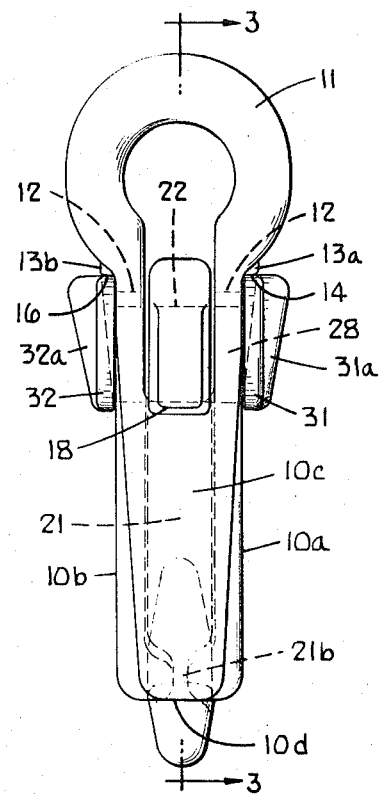
FIG. 2 is an end view of the structure of FIG. 1 taken from the closure arm end of the structure.
Figure 3:
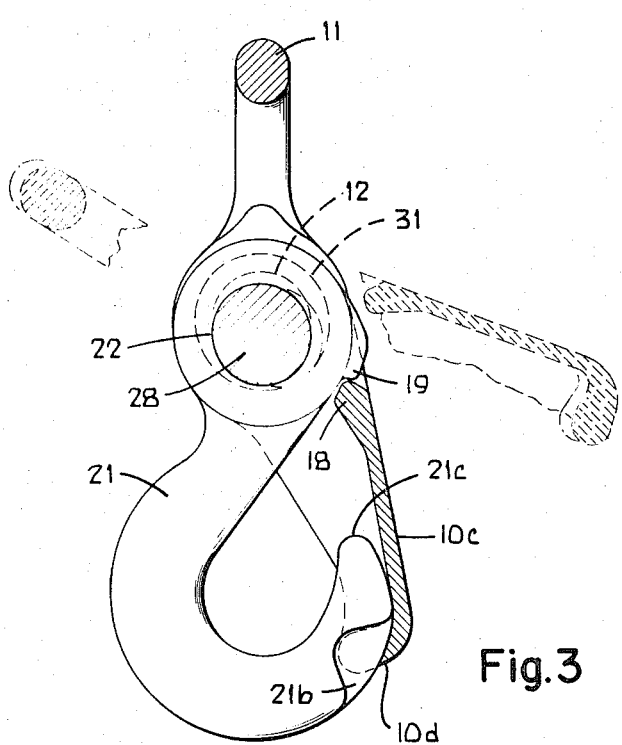
FIG. 3 is a side sectional view taken generally along the lines 3—3 of FIG. 2 and with obscuring portions broken away.

In operation, referring primarily to FIG. 3, when the closure arm and hook are in their solid line positions, the knob members 31 and 32 will be in their position of FIGS. 1 and 2 and the closure arm will be locked against vertical (as viewed in FIG. 3) motion with respect to each other. Under these conditions the abutments 18 and 19 will be in engagement with each other and the composite closure arm formed by the parts 10a, 10b and 10c will be locked into position across the open end of the hook 21. Tension on the hook assembly, as occurs when it is under load, tends to lock the closure arm more tightly into position across the bight of the hook. The tip of the hook is supported by the bifurcated lower end of the closure arm and the overlap of the arm and the reduced thickness portion of the hook are such as to permit, if desired, the drilling of this overlapping portion to accomodate a locking pin (not shown) extending through these overlapping portions.

To unlatch or release the closure arm, either of the knob members 31 or 32 is rotated through 180° to the position indicated in FIG. 4. When this has been done, a clearance, measured by the distance 36 in FIG. 4, will exist between the periphery of the knobs and the adjacent camming surfaces on the clevis. This clearance is sufficient for the closure arm to move outwardly with relation to the abutment 19 on the hook and permit the abutment 18 to clear the abutment 19 as the arm and hook are moved apart, the arm to its broken line position of FIG. 3. To lock the closure arm across the hook, it may be returned to its solid line position of FIG. 3. It may then be locked in this position by rotation of either of the knobs moving the knob periphery into engagement or closely adjacent to the curved cam surfaces on the clevis (the position shown in FIG. 2).

I claim:

1. A safety hook having a clevis with spaced arms adapted for attachment to a load and having registering apertures in its spaced arms, said apertures being elongated in the direction of load application to the clevis, a hook having a circularly apertured eye portion adapted to extend between said clevis arms with its circular aperture registering with the elongated apertures in the arms, a pivot pin of circular cross section extending through the registering clevis and hook apertures, said pin and hook being rectilinearly moveable within said elongated apertures in the clevis arm, said clevis having a closure arm spanning the open side of said hook, cooperating abutment means on said hook and said clevis engaged when said hook is at one limit of its rectilinear movement within said clevis arm apertures to lock said closure arm across the open side of the hook, said cooperating abutment means taking the form of a surface formed on said clevis and extending between the spaced clevis arms and an opposing surface extending from the periphery of said eye portion of the hook, and cooperating cam elements on said clevis and said pivot pin for selectively holding said pin and hook at said one limit of movement within the clevis arm apertures or freeing said pin and hook from said motion limit to permit disengagement of said cooperating abutment means to release said arm from its locked position across the open end of said hook.

2. A safety hook as claimed in claim 1 in which said cam elements take the form of a curved surface on said clevis adjacent one end of at least one of the arm apertures, and a cam disc whose periphery engages said surface, said disc being carried by said pivot pin and mounted eccentrically with respect to the longitudinal axis of said pin.

3. A safety hook as claimed in claim 2 in which a finger grip rib is provided on said disc to facilitate manual rotation thereof.

* * * * *